US011714841B2

United States Patent
Agrawal et al.

(10) Patent No.: US 11,714,841 B2
(45) Date of Patent: *Aug. 1, 2023

(54) SYSTEMS AND METHODS FOR PROCESSING A NATURAL LANGUAGE QUERY IN DATA TABLES

(71) Applicant: Google LLC, Mountain View, CA (US)

(72) Inventors: Nikunj Agrawal, New Delhi (IN); Mukund Sundararajan, Sunnyvale, CA (US); Shrikant Ravindra Shanbhag, Jersey City, NJ (US); Kedar Dhamdhere, Sunnyvale, CA (US); Null Garima, Bengaluru (IN); Kevin Snow Mccurley, San Jose, CA (US); Rohit Ananthakrishna, Bangalore (IN); Daniel Adam Gundrum, New York, NY (US); Juyun June Song, Brooklyn, NY (US); Rifat Ralfi Nahmias, Mountain View, CA (US)

(73) Assignee: Google LLC, Mountain View, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 17/306,666

(22) Filed: May 3, 2021

(65) Prior Publication Data

US 2021/0271697 A1 Sep. 2, 2021

Related U.S. Application Data

(63) Continuation of application No. 15/408,664, filed on Jan. 18, 2017, now Pat. No. 10,997,227.

(51) Int. Cl.
*G06F 16/00* (2019.01)
*G06F 16/338* (2019.01)
(Continued)

(52) U.S. Cl.
CPC ........... *G06F 16/338* (2019.01); *G06F 3/167* (2013.01); *G06F 16/3326* (2019.01);
(Continued)

(58) Field of Classification Search
None
See application file for complete search history.

(56) References Cited

U.S. PATENT DOCUMENTS 5,386,556 A * 1/1995 Hedin ............... G06F 16/24526
5,734,889 A 3/1998 Yamaguchi
(Continued)

OTHER PUBLICATIONS

Flood et al., "NLP-SIR: A Natural Language Approach for Spreadsheet Information Retrieval," Dundalk Institute of Technology, 2009, pp. 1-12.

*Primary Examiner* — Farhan M Syed
(74) *Attorney, Agent, or Firm* — Lowenstein Sandler LLP (57) ABSTRACT

Systems and methods are disclosed herein for processing a natural language query on data tables. According to some embodiments, a natural language query may be originated by a user via a user interface. The natural language query may be parsed to obtain a query term, and a grid range may be identified in a data table as relevant to the query term. A table summary may be prepared including a plurality of characteristics based on the grid range. A logic operation may then be determined to apply on the plurality of characteristics to derive the query term. The logic operation may then be translated into a formula executable on the data table, and the formula is applied on the data table to generate a result in response to the natural language query.

20 Claims, 6 Drawing Sheets

(51) Int. Cl.
  *G06F 3/16* (2006.01)
  *G06T 11/20* (2006.01)
  *G06F 16/332* (2019.01)
  *G06F 16/33* (2019.01)
  *G06F 40/18* (2020.01)
  *G06F 40/58* (2020.01)
  *G06F 40/205* (2020.01)

(52) U.S. Cl.
  CPC .......... *G06F 16/3337* (2019.01); *G06F 40/18* (2020.01); *G06F 40/58* (2020.01); *G06T 11/206* (2013.01); *G06F 40/205* (2020.01)

(56) References Cited

U.S. PATENT DOCUMENTS

| | | | |
|---|---|---|---|
| 5,960,384 A | 9/1999 | Brash | |
| 5,963,940 A | 10/1999 | Liddy et al. | |
| 6,026,388 A | 2/2000 | Liddy et al. | |
| 6,615,209 B1 * | 9/2003 | Gomes | G06F 16/338 |
| | | | 707/999.005 |
| 6,629,097 B1 | 9/2003 | Keith | |
| 6,763,359 B2 | 7/2004 | Lohman et al. | |
| 7,181,465 B2 | 2/2007 | Maze et al. | |
| 7,216,121 B2 | 5/2007 | Bachman et al. | |
| 7,779,002 B1 * | 8/2010 | Gomes | G06F 16/338 |
| | | | 707/693 |
| 7,853,551 B1 * | 12/2010 | Gill | G06Q 10/06 |
| | | | 706/55 |
| 8,214,359 B1 * | 7/2012 | Gomes | G06F 16/338 |
| | | | 707/721 |
| 8,364,462 B2 * | 1/2013 | Joy | G06F 40/53 |
| | | | 707/706 |
| 8,577,910 B1 | 11/2013 | Hodge et al. | |
| 8,620,890 B2 | 12/2013 | Bennett et al. | |
| 8,996,433 B2 | 3/2015 | Ginzberg | |
| 9,047,278 B1 | 6/2015 | Mann et al. | |
| 9,060,001 B2 | 6/2015 | Luong et al. | |
| 9,330,090 B2 | 5/2016 | Gulwani et al. | |
| 9,623,119 B1 | 4/2017 | Kim et al. | |
| 10,303,686 B2 | 5/2019 | Lee et al. | |
| 2002/0198867 A1 | 12/2002 | Lohman et al. | |
| 2003/0088581 A1 | 5/2003 | Maze et al. | |
| 2003/0187844 A1 | 10/2003 | Li et al. | |
| 2003/0233224 A1 | 12/2003 | Marchisio et al. | |
| 2004/0128270 A1 | 7/2004 | Bachman et al. | |
| 2004/0139106 A1 | 7/2004 | Bachman et al. | |
| 2004/0139107 A1 | 7/2004 | Bachman et al. | |
| 2004/0221235 A1 | 11/2004 | Marchisio et al. | |
| 2004/0260534 A1 * | 12/2004 | Pak | G10L 15/1822 |
| | | | 704/7 |
| 2005/0177358 A1 * | 8/2005 | Melomed | G06F 16/24522 |
| | | | 704/2 |
| 2005/0187913 A1 * | 8/2005 | Nelken | G06F 16/951 |
| 2007/0100650 A1 | 5/2007 | Ramer et al. | |
| 2008/0115084 A1 * | 5/2008 | Scott | G06F 3/0482 |
| | | | 715/810 |
| 2009/0292681 A1 | 11/2009 | Wood et al. | |
| 2009/0326914 A1 * | 12/2009 | Joy | G06F 40/129 |
| | | | 704/3 |
| 2010/0070448 A1 | 3/2010 | Omoigui | |
| 2011/0314032 A1 | 12/2011 | Bennett et al. | |
| 2013/0103694 A1 | 4/2013 | Luong et al. | |
| 2014/0188864 A1 | 7/2014 | Bennett et al. | |
| 2015/0019216 A1 | 1/2015 | Singh et al. | |
| 2015/0039597 A1 | 2/2015 | Raina et al. | |
| 2015/0227633 A1 | 8/2015 | Shapira | |
| 2016/0171050 A1 | 6/2016 | Das | |
| 2016/0241577 A1 | 8/2016 | Johnson et al. | |
| 2016/0246885 A1 | 8/2016 | Aravamudhan et al. | |
| 2016/0247165 A1 | 8/2016 | Ryabchun et al. | |
| 2016/0307000 A1 * | 10/2016 | Nguyen | G06F 21/64 |
| 2017/0060856 A1 | 3/2017 | Turtle et al. | |
| 2017/0060868 A1 | 3/2017 | Rais Ghasem et al. | |
| 2017/0185918 A1 | 6/2017 | Chawla et al. | |
| 2017/0185919 A1 | 6/2017 | Chawla et al. | |
| 2017/0185920 A1 | 6/2017 | Chawla et al. | |
| 2018/0181613 A1 | 6/2018 | Acharya et al. | |

* cited by examiner

SYSTEMS AND METHODS FOR PROCESSING A NATURAL LANGUAGE QUERY IN DATA TABLES

RELATED APPLICATION

This application is a continuation of U.S. patent application Ser. No. 15/408,664 filed Jan. 18, 2017, the entire content of which is hereby incorporated by reference.

BACKGROUND

A spreadsheet is a data document that includes one or more data tables storing data under different categories. Sometimes the spreadsheet can perform calculation functions. When a user wants to obtain certain data from the spreadsheet, the user can construct a database search query to look for the desired data. Sometimes, if the user-desired data is not previously stored by the spreadsheet, the user may use available data from the spreadsheet to derive the desired data. The user may review the spreadsheet and identify relevant data entries in the spreadsheet, and then compile a formula using the calculation function associated with the spreadsheet to calculate the result. For example, when the spreadsheet records a test score for each student in a class, a user may want to know the average score of the class. Then the user may need to compile a formula by summing up the test scores and then dividing by the number of students to obtain the average score of the class. The data table may then calculate the average score of the class based on the compiled formula. Thus the user may need to manually compile a formula and input it into the data table for calculation, which may be inefficient when processing a large amount of data, and also requires a high level of knowledge of database operations from the user.

SUMMARY

Systems and methods are disclosed herein for processing a natural language query on data tables, e.g., a spreadsheet, etc. According to some embodiments, a natural language query may be originated by a user via a user interface. The natural language query may be parsed to obtain a query term, and a grid range may be identified in a data table as relevant to the query term. A table summary may be prepared including a plurality of data entities based on the grid range. A logic operation may then be determined to apply on the plurality of data entities to derive the query term. The logic operation may then be translated into a formula executable on the data table, and the formula is applied on the data table to generate a result in response to the natural language query.

The natural language query may be parsed to obtain a query term, and a grid range may be identified in a data table as relevant to the query ter. A table summary may be prepared by extracting a plurality of characteristics from the grid range in the data table. A logic operation may be determined to apply on the plurality of characteristics to derive a result corresponding to the query term. The logic operation may be translated into a formula executable on the data in the data table, and the formula may be applied to the data in the data table to generate the result in response to the natural language query. Responsive to receiving negative feedback to the result, the negative feedback may be automatically processed and a new table summary may be prepared or a new logic operation may be determined based on the query term. An alternative interpretation of the natural language query may be determined based on at least one of the new table summary or the new logic operation, and an alternative result may be generated based on the alternative interpretation.

In some implementations, the natural language query is submitted by the user via a user interface at a client device, and is manually or vocally entered by the user. The natural language query may be received at a server from a client device via a hypertext transfer protocol (HTTP) post request. The natural language query may be originated in a first language (e.g., non-English, etc.) and may then be translated into a second language, e.g., English, for processing.

In some implementations, a grid range is identified at a client device when the data table is stored at the client device, or at a server after receiving the natural language query at the server when the data table is stored at the server.

In some implementations, the data table includes any data table stored at a client device, a remote server, or a cloud.

In some implementations, the plurality of data entities include any of dimensions, dimension filters and metrics.

In some implementations, the result is presented to the user via a visualization format including any of an answer statement, a chart, or a data plot.

In some implementations, the formula may be sorted associated with the natural language query or the query term when the user feedback is positive.

In some implementations, translating the logic operation into the formula includes selecting a formula build operation from a plurality of formula build operations based on the logic operation and executing the formula build operation to generate the formula based on the table summary and the logic operation. The formula build operation may correspond to a type of formula.

In some implementations, the result may be translated from a second language (e.g., English) into a first language (e.g., non-English) when the natural language query is received in the first respective language from the user.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

To provide an overall understanding of the disclosure, certain illustrative embodiments will now be described, including systems and methods for connecting with remote databases. In particular, a connection between an application and a remote database is described. The application modifies the format of the data imported from the remote database before displaying the modified data to the user. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. Generally, the computerized systems described herein may comprise one or more engines, which include a processing device or devices, such as a computer, microprocessor, logic device or other device or processor that is configured with hardware, firmware, and software to carry out one or more of the computerized methods described herein.

Systems and methods for processing a natural language query allow a user to enter a query for data in natural language. The natural language query may be translated into a structured database query. When the structured database query indicates the data is not readily available in the data table, existing data entries may be identified in the data table that may be relevant to generate the desired data, and a formula may be automatically compiled to derive the desired data based on the available data entries.

For example, when the data source includes a spreadsheet that records a test score for each student in a class, a user may input a natural language query "what is the average score of the class?" The natural language query may be interpreted and parsed by extracting terms from the query, such as "what," "is," "the," "average," "score," "of," "the," and "class." Among the extracted terms, the term "average score" may be identified as a key term of the query based on previously stored key terms that are commonly used. It may then be determined that no data entry is available in the spreadsheet corresponding to the data category "average score," e.g., no column header corresponds to "average score." Logic may then be identified to derive an "average score" from the existing data entries. For example, it may be determined that an "average score" may be calculated by summing up all the test scores in the class and dividing the sum by the total number of students. A formula may then be automatically generated to calculate the "average score" and output the calculation result to the user in response to the natural language query. The generated formula may be stored in association with a tag "average score" such that even when the spreadsheet is updated with more data entries, e.g., with new test scores associated with additional students, the formula may still be applicable to automatically calculate an average score of the class, in response to the natural language query.

In this way, a user may get an answer about their data in a faster and more efficient way than by manually entering formulas or doing other forms of analysis by hand. For users who may not have the knowledge of all the features of the spreadsheet, the platform may help the users to generate structured queries or even formulas.

Figure 1:
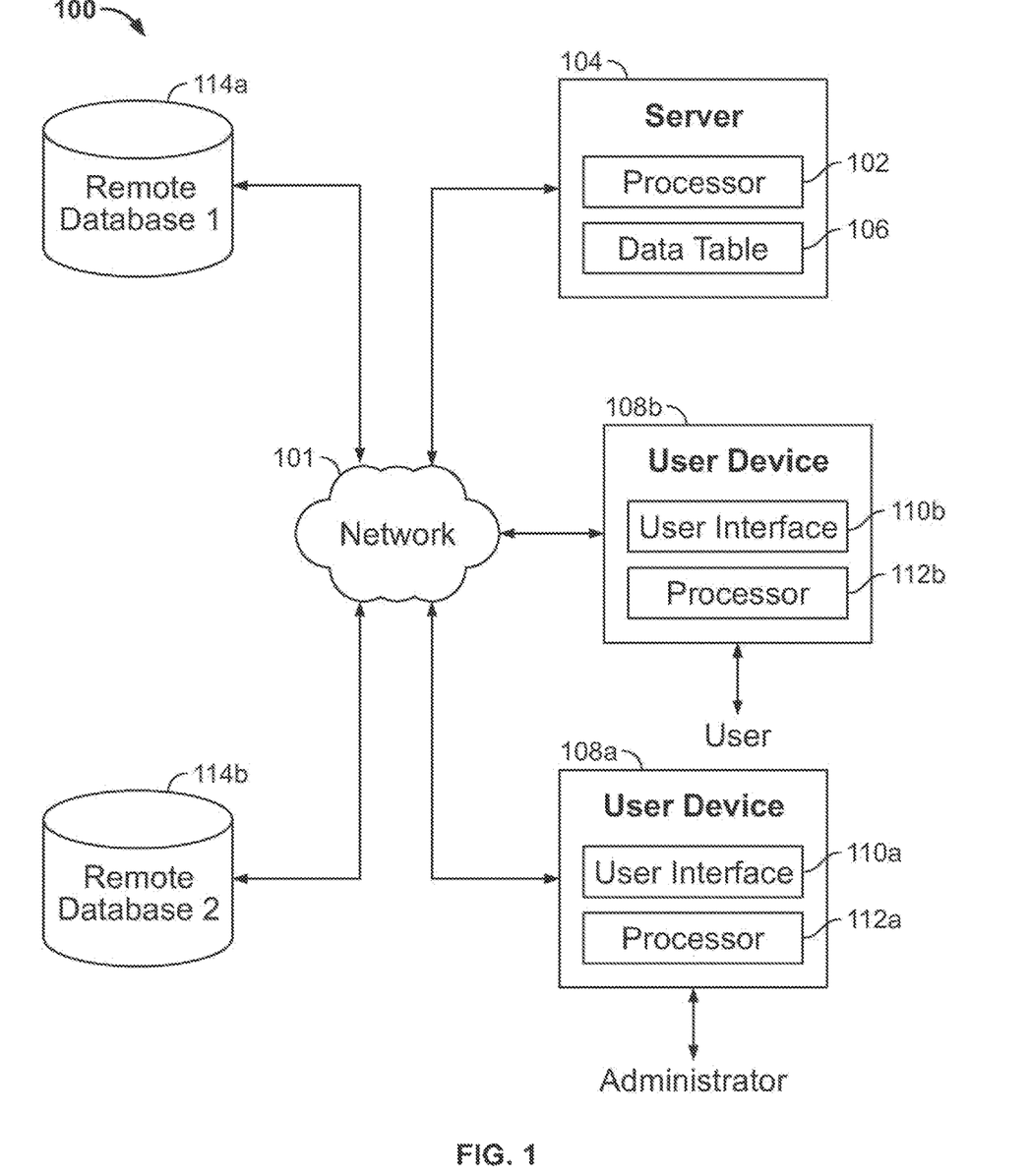
FIG. 1 is a block diagram of a computerized system 100 for natural language query processing, according to an illustrative embodiment.

FIG. 1 is a block diagram of a computerized system 100 for natural language query processing, according to an illustrative implementation. The system 100 includes a server 104, two remote databases 114a-114b (generally referred to as remote database 114), user devices 108a-b (generally referred to as user device 108), and/or other related entities that communicate with one another over a network 101. The user devices 108a and 108b contain user interfaces 110a and 110b (generally referred to as user interface 110) respectively.

Each user device 108 includes a device such as a personal computer, a laptop computer, a tablet, a smartphone, a personal digital assistant, or any other suitable type of computer of communication device. Users at the user device 108 access and receive information from the server 104 and remote databases 114 over the network 101. The user device 108 may include components, such as an input device and an output device. In some implementations, a user may operate the user device 108 to input a natural language query via the user interface 110, and the processor 112a-b (generally processor 112) may process the natural language query. In some implementations, the user device 108 may process the natural language query locally and search within a local database. In some implementations, the user device 108 may send the natural language query to a remote server 104, which may store data tables 106 and use a processor 102 to analyze the natural language query.

The server 104 may provide updates and may access remote databases 114a-b for a data query. Thus, when a natural language query is received at the user device 108, upon translation of the query into a database query, the database query may be performed locally at the user device 108, at the data tables 106 stored at the server 104, or at the remote databases 114 (e.g., cloud, etc.).

In some implementations, the user device 108 may have a locally installed spreadsheet application for a user to review data and enter a natural language query. In some implementations, such spreadsheet application may not be installed at the user device 108, and a user may access a spreadsheet or a data table stored at the server 104 via a remote access component within a browser application, or a mobile application.

Figure 2A:
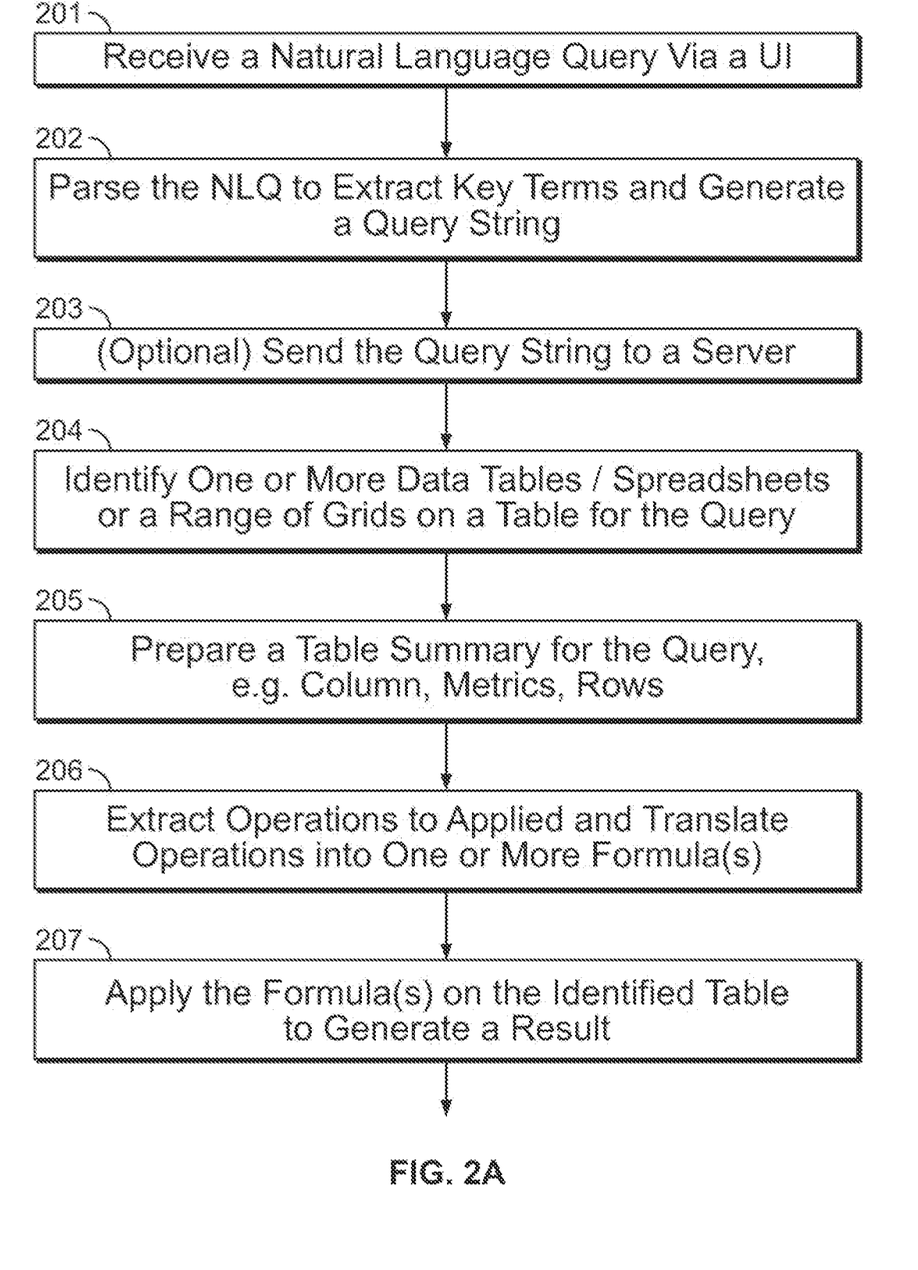
FIG. 2A-2B provides an example logic flow diagram illustrating aspects of processing a natural language query in a data spreadsheet, according to some embodiments described herein.
Figure 2B:
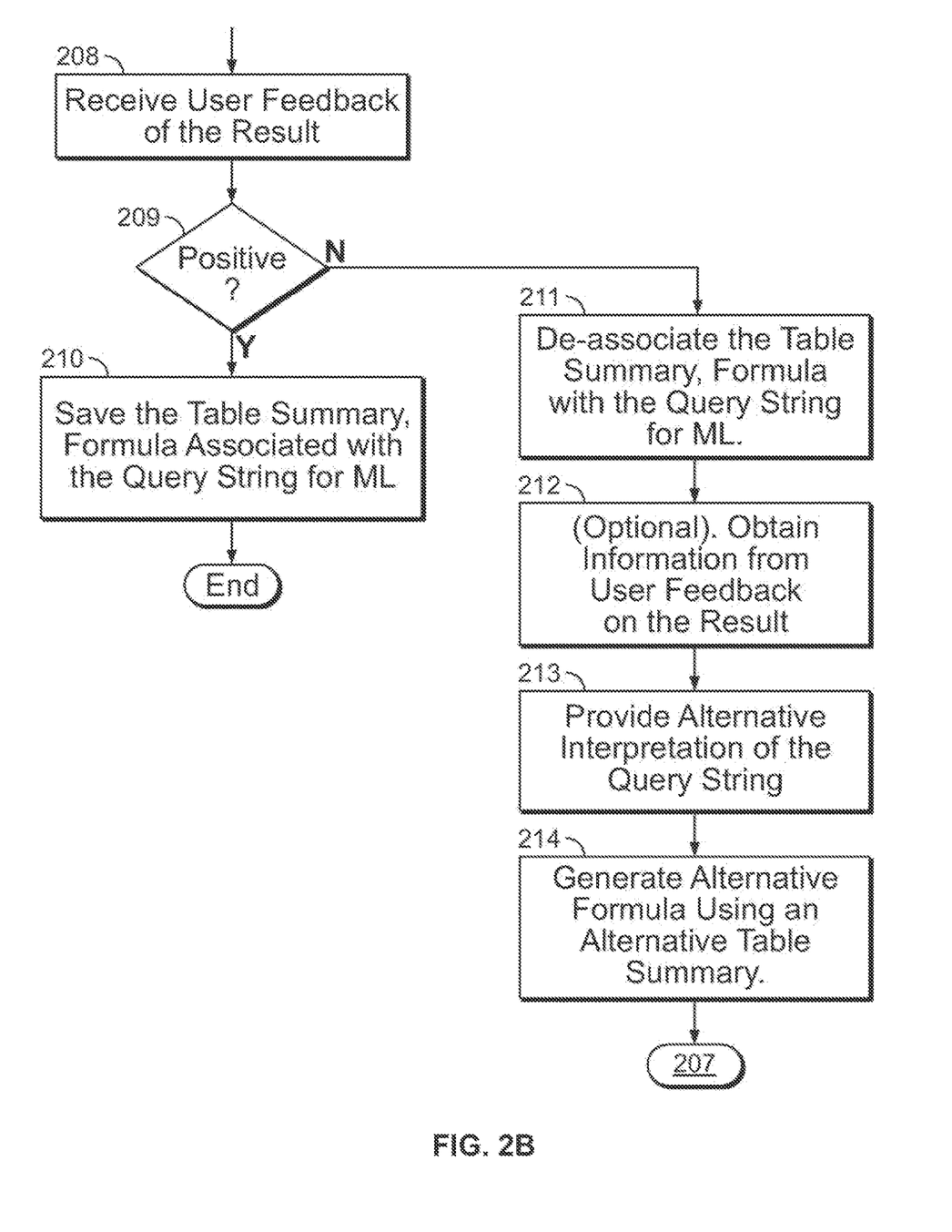

FIGS. 2A-2B provide an example logic flow diagram illustrating aspects of processing a natural language query in a data spreadsheet, according to some implementations described herein. At 201, a natural language query may be received via a user interface, e.g., at the user interface 110 of a user device 108 in FIG. 1. The natural language query may be a question entered by a user such as "how's the growth of monthly total sales," "what is the average score of MATH 301," and/or the like. The natural language query may be manually typed in by a user via an input device, or articulated by the user via a microphone and captured by the user device. The natural language query may also be automatically generated by an analytics application and passed through to the server via an application programming interface (API) from another program. For example, a business analytics software may automatically generate a list of business analytics questions such as "how's the growth of monthly total sales" in a natural language, and the question may be automatically sent to the server. In some implementations, the natural language query may be originated in a variety of different natural language, and may be translated into a language compatible with the platform (e.g., the operating system, or the natural language query processing tool, and/or the like), such as English, etc.

At 202, the natural language query may optionally be parsed to extract key terms and a query string may be generated. In some implementations, the parsing may be performed at the user device. Or alternatively, the server may receive a parse request over Hypertext Transfer Protocol (HTTP) from the user device. The server may send a request to an analytics module (e.g., see 305 in FIG. 3). For example, for a natural language question "what is the monthly growth of sales," words in the question may be extracted and assessed to rule out words such as "what," "is," "the," "of," etc. as meaningful query terms. Words such as "monthly growth" and "sales" may be identified as query terms based on previously stored query term rules and/or heuristics from previously processed queries.

At 203, the query string may optionally be sent to the server. Alternatively, the natural language query may be processed within one or more spreadsheets that are locally stored on the user device.

At 204, one or more data tables or spreadsheets, or a grid range of a spreadsheet, may be identified as relevant to the query string. A table detection module (e.g., see 307 in FIG. 3) may be used to output tables detected from originally stored data tables or spreadsheets, e.g., based on heuristics or machine learning. For example, natural language key terms from the query string may be used to identify relevant data tables/spreadsheets. When the query string includes key terms such as "growth," "monthly," "sales," data tables/spreadsheet that have a column or a row recording monthly sales may be identified. As another example, data tables/spreadsheet can also be identified based on previously used data tables for similar query strings, e.g., when a natural language query "what is the monthly distribution of sales" identified a certain data table, the same data table may be identified for the query "how's the growth of monthly total sales" as well.

The selected range of cells from the data table may be flipped in orientation if necessary. In some implementations, the user may manually select the cells by selecting a single cell or a range of cells that may belong to a table. The cells surrounding the selection are analyzed for possible table structures.

In some implementations, a table schema may be generated based on the selected range of cells. Sometimes when the whole table schema is too small, to avoid communication of a large number of small messages from the client device to the server and improve communication efficiency, several table schemas may be sent in a batch request to the server. When the identified table is too large to include in an XMLHttpRequest (XHR) request, the user device may only send the grid range of the detected table (for chart recommendations), and the server may determine a table structure from the sent grid range.

At 205, the server may prepare a table summary by extracting the dimensions, columns, rows, metrics, dimension filters, and/or other characteristics of the detected data table, and map the extracted table characteristics to cell ranges or addresses in a spreadsheet. For example, for a data table recording monthly sales data of the year, the table summary may include the number and index of rows and columns, the corresponding value in a cell identified by the row and column number, the metric of the value, and/or the like.

At 206, the server may extract operations to be applied to the data table, and translate the operations into one or more formulas executable on the data table. Further details of the formula building embodiments may be found in connection with FIG. 3.

At 207, the server may send the formula(s) back to the user device, and the formula(s) may be applied on the detected data table to generate a result in response to the natural language query. In some implementations, the generated result may be presented via different visualization, such as, but not limited to, a pie chart, a data plot, and/or the like.

At 208, when the user receives the result in response to the original question via a user interface (e.g., see FIG. 4), the user may provide feedback on the result. For example, the user may provide a positive rating if the result is accurate. Or, the user may submit a negative rating when the result is unsatisfactory, e.g., misinterpreting the question, insufficient data, etc. When the user feedback is positive at 209, the server may save the formula building objects such as the table summary, formula(s) associated with the query string, for machine learning purposes at 210, so that the formula may be reused, or used as a reference when similar questions are received. When the user feedback is negative at 209, the server may disassociate the formula building objects with the question at 211, so that when similar questions are received, such questions are not to be interpreted in the same way.

At 212, the server may optionally obtain further information from the user feedback on the result. For example, if the user asks "how's the monthly growth of sales," and a result of the monthly increase from last month to the current month is provided but the user submits negative feedback, the user interface may prompt the user to provide further information. The user may be prompted to re-enter the question with a time period "how's the monthly growth of sales from ______ to ______?" Or the user interface may prompt the user to confirm whether the identified data entities "monthly growth" and "sales" are accurate. As another example, the user interface may provide suggested queries to the user, if the server fails to parse and identify what the natural language query is. Other additional methods may be employed for the user to provide further detailed feedback to refine the question.

At 213, the server may provide an alternative interpretation of the query string based on information obtained at 212, and may generate an alternative formula using the alternative table summary at 214. Then the server may proceed at 207 to provide the updated result to the user.

Figure 3:
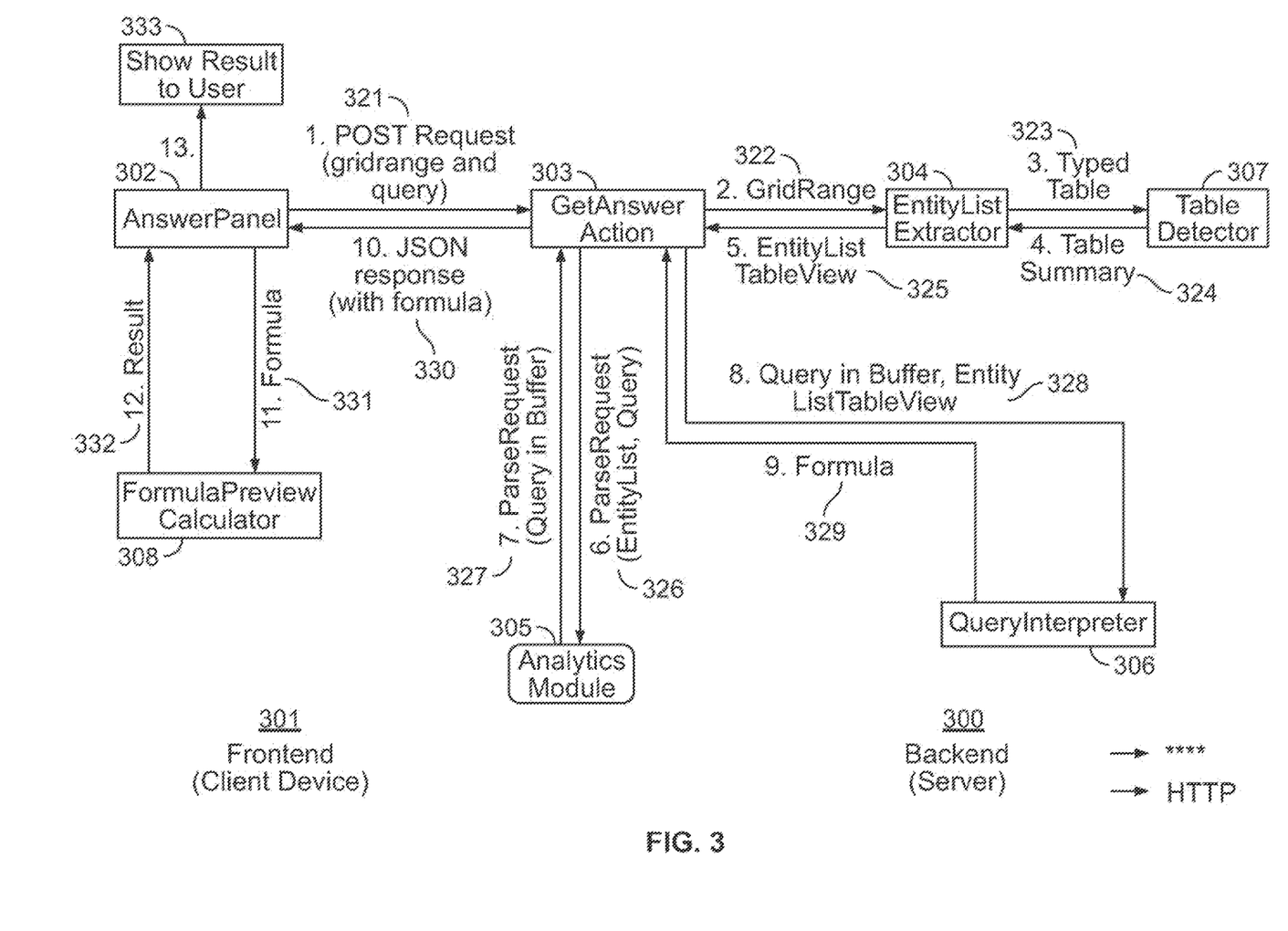
FIG. 3 provides a block diagram illustrating example aspects of data flows between various components at the client side and the server side to process a natural language query, according to some embodiments described herein.

FIG. 3 provides a block diagram illustrating example aspects of data flows between various components at the client side and the server side to process a natural language query, according to some embodiments described herein. At the front end 301 (e.g., a client/user device 108 in FIG. 1), a user interface may present an answer panel 302 (e.g., see 401-402 in FIG. 4), which may post a query request 321 to a backend server 300 (e.g, the server 104 in FIG. 1). The query request 321 may include a query string (e.g., the question asked by a user, or key terms extracted from the original natural language question asked by the user, etc.), a list of data entities (e.g., table schema generated based on key terms from the query string, etc.), a grid range from an existing data table, and/or the like. The backend server 302 may be operated under a java environment, and may pass the query request 321 to be processed at a series of modules such as but not limited to a get-answer action module 303, an entity list extractor 304, an analytics module 305, a query interpreter 306, a table detector 307, and/or the like.

The get-answer action module 303 may act as a communication interface that receives the client request 321, which may include query parameters such as a query string (e.g., question asked by user, etc.), a grid range of the data table detected in and around cell selection, and/or the like. If the request 321 has reached the server, the grid range may contain a constructed table. On the other hand, if no data table is detected or the selected grid range does not contain any data, the answer panel interface 302 may not be presented to a user at the beginning. The get-answer action module 303 may send the grid range information 322 to the entity list extractor 304 to get a table view of the data entity list based on the grid range information, e.g., a sub-table having columns and rows defining relevant data entities.

The entity list extractor 304 may construct a table schema. e.g., a data entity list including data entities relevant to the query. The entity list extractor 304 may obtain a table summary 324 (e.g., including column headers, data types, labels column, cell metrics, and/or other properties) from the table detector 307. The entity list extractor 304 may also build a typed table 323 from the grid range and pass it on to the table detector 307 for summarization.

The entity list extractor 304 may provide a table view that is an object representation of the data entity list. The entity list may be represented in a data structure as a per-table knowledge graph, represented by graph nodes such as but not limited to dimensions, dimension filters, metrics, and/or the like. Dimensions may include header of a column whose values act as row keys (or labels) into the table. For example, "Country" will be a dimension in a table with country names as labels or row keys). Dimension filters may include values in the dimension column (row keys/label column). For example, "India", "USA" are the dimension filters for the dimension "Country." Metrics may include all number columns taken as metrics or column values. Generally, a user may look for a metrics for a particular dimension filter (or label). For example, in the string "Population of India," "Population" is identified as a metric and dimension filter is identified as "India" for dimension "Country."

The entity list extractor 304 may provide an entity list table view 325 to the get-answer action module 303. The entity list table view 325 may be generated by extracting metrics, dimensions and dimension filters from the table summary 324. For example, it may be assumed that all column headers that correspond to cells with numeric values are metrics (e.g., a column header "population" is a metric as in the above example), all string and date/time column headers are dimensions (e.g., a column header "country," a text string, is a dimension) and the values in these dimension columns are dimension filters (e.g, values under the column header "country" such as "USA." "India" etc., are dimension filters). Other determination of the metrics, dimensions and dimension filters can be applied. In addition, the entity list table view 325 may serve to reverse lookup row and column indices given a dimension, metric or dimension filter string, which may be used to map parameters such as dimensions, metrics, dimension filters back to the grid row and column indices during formula construction. To allow this, the entity list table view 325 may provide a metrics-to-column number map, a dimensions-to-column number map, and a dimension-filters-to-row-and-column pair map.

The table detector 307 may extract information from a data table and generate a table summary 324, which may be used to determine what entities in the table can be used to generate a formula to derive the query term. Tables can be generally represented as a common object, which stores the data in a table, the column headers and types of data in the columns, and derived facts about the data.

The table detector 307 may extract information from a data table in several steps. First, light parsing of cells and inference of column headers and data types may be performed. For cells having numeric values between 1900-2100, the cells may be interpreted as years, instead of pure numeric values. The table detector 307 may then filter out spurious rows and columns, including but not limited to empty rows/columns, numeric columns with ID numbers, columns for taking notes, and/or the like.

The table detector 307 may then add column-based statistics. For example, for all column types, the number of missing or distinct values may be recorded. For numeric columns, the number of negative/positive/floats/zero values, as well as the sum, standard deviation, monotonicity and uniformity of the array may be recorded. For string columns, the ratio of numeric to non-numeric characters, an average string length, and a maximum string length may be recorded.

The table object created from the input table cell values from the data table 323 may then used to create an aggregate table. Each column in the aggregate table may be inspected to determine a number of unique values as compared to the number of total values (e.g., the range of data values). If the column is categorical (e.g., when the unique values in the column is a subset of the entire spectrum of data values), then the column may be used to create an aggregated table.

For each categorical column, two aggregated objects may be created in association with the column. A new "count" aggregated object may be created to record information relating to the "count" of a unique value. For example, each row of the object may represent a unique value, and in each row, the first cell stores the unique value and the second cell records the number of times that the respective unique value appears in the original categorical column.

A new "sum" aggregated object may be created to record the total sum of each unique value in the original table. For example, each row of the object represents a unique value, and each column of the object represents a categorical numeric column in the original table 323. The value in each cell of the object represents a sum of unique values of all cells in the respective categorical column that contain the respective unique value (based on the respective row of the object).

For example, if the original data has two columns like:

TABLE 1

Example Data Grid

| | |
|---|---|
| Yes | 1 |
| Yes | 3 |
| No | 2 |
| Yes | 5 |
| No | 3 |
| No | 2 | instead of charting or responding with the raw data grid above, the first column may be pivoted or grouped and the second column is to be summed per distinct entries in the first column so that Table 1 can be recorded as "Yes, 9; No, 7" Or alternatively, the count of each repeated entry "Yes" or "No" may be recorded such that Table 1 can be recorded as "Yes, 3; No, 3."

The "count" and "sum" object may be example objects for aggregation. Alternatively, average aggregation objects may be created, e.g., using an average value of the "count" or "sum." The objects recording the count and sum of each unique value may be used to carry information of the original data table 323.

The get-answer action module 303 may also send a parse request 326 including data entity list information and query information to the analytics module 305, which may generate a parse response 327. The parse response 327 may include a structured data table/spreadsheet query represented as the query in the protocol buffer.

The query interpreter 306 may interpret returned query response 328 to an executable formula 329 string using the entity list table view passed on from the get-answer action module 303. The query interpreter 306 may include various comparable classes for formula builder, e.g., a particular formula builder may correspond to one type of formula. Here a given set and count of fields in the query 328 may correspond to only one formula, e.g., a query with exactly two metrics corresponds to a correlation formula.

For example, the query interpreter 306 may invoke a variety of operations. An example operation includes a query scoring operation, e.g., scoreQuery (the query in the protocol buffer), which returns a score, built simply by counting the number of fields of the input query in the protocol buffer it can consume, or returns a negative/zero score if the fields in the query in the protocol buffer are not sufficient to build a formula. For example, if the input query in the protocol buffer having two dimension filters and a dimension, is passed to a formula builder that requires at least one dimension filter and at least one dimension, the scoreQuery( ) operator may return a score of two (e.g., one point for satisfying the at least one dimension requirement and one point for satisfying the at least one dimension filter requirement). The score of two (non-zero) indicates that the parameters included in the query in the protocol buffer are sufficient for formula building. In some situations, a given query may have more than one formula builder that may return the same score, e.g., if another formula builder that requires just two dimension filters, the input query in the protocol buffer in the above example would also be given a score of two with this formula builder.

The query interpreter 306 may then run a getFormula (query in the protocol buffer, EntityListTableView) operation, based on the input of the query and the entity list table view at 328. After determining that the query score is a positive number, the query interpreter 306 may return a formula built by joining data in the input values query in the protocol buffer and EntityListTableView.

The query interpreter 306 may take in a list of formula builders available (injected), and may interpret the input query in the protocol buffer by first scoring each formula builder by the number of fields of the input query in the protocol buffer may consume. This may filter out a set of formula builders that cannot understand the input query in the protocol buffer. If there is at least one formula builder with a positive score in response to the input query in the protocol buffer, the formula builder with the highest score may be used to map a formula 329. In this way, the formula builder that consumes the maximum number of fields from the input query in the protocol buffer can be used to construct the possible formula parses.

The query interpreter 306 may be structured as a class with multiple smaller formula builders plugged into it. In this way, the query interpreter structure can be expandable with additional formula builders. For example, when a different type of query is received, new formula type may be added to the formula builders without the need to change the existing formula builder.

When the get-answer action module 303 receives a formula 329 from the query interpreter 306, a JSON response 330 including the formula may be returned to the answer panel 302 at the frontend 301 (e.g., at the client side). The answer panel 302 may then provide the formula 331 to a formula preview calculator 308, which may in turn generate a result 332 based on the formula. The answer panel 302 may then provide the result to the user at 333.

Figure 4:
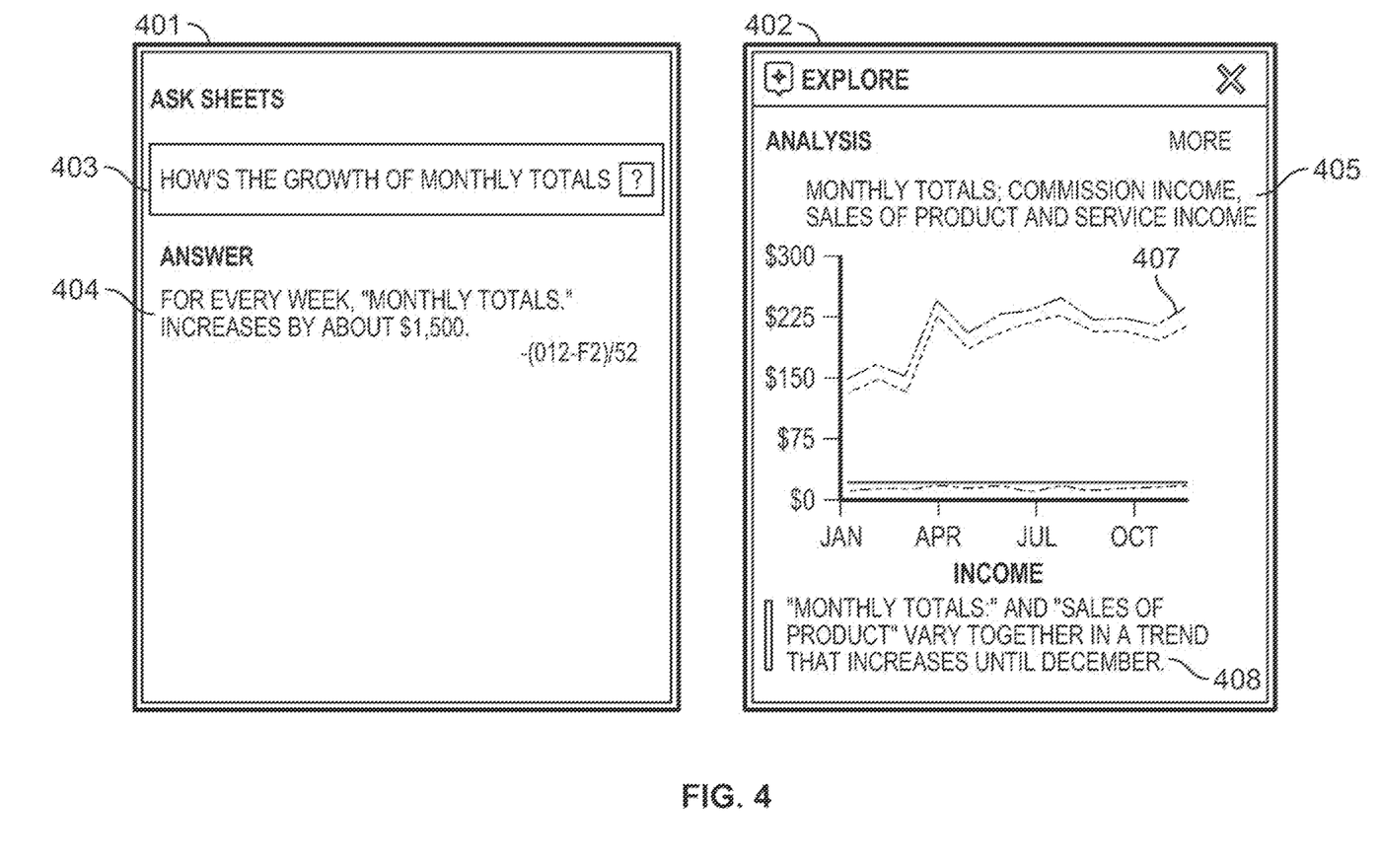
FIG. 4 provides an example user interface diagram illustrating aspects of the answer panel (e.g., 302 in FIG. 3), according to some embodiments described herein.

FIG. 4 provides an example user interface diagram illustrating aspects of the answer panel (e.g., 302 in FIG. 3), according to some embodiments described herein. Example mobile interface 401 and 402 show example mobile screens of the answer panel 302. In other implementations, the answer panel 302 may have an interface on a desktop computer, e.g., similar to a browser-based application.

At screen 401, a user can type a natural language question in the query box 403, e.g., "how's the growth of monthly totals?" As another example, the query box 403 may provide a suggested query in response to the user entered question, to help users better understand how to structure their own questions using the precise terms. The question intake at the query box 403 may also automatically complete, or correct typographical mistakes from, the user-entered question, so that the data entities for the query can be auto-completed. In some implementations, the query may be annotated with same colors with relevant sections in a spreadsheet to show how key terms in the query relate back to sections in the spreadsheet.

An answer may be provided at 404, e.g., a statement containing a calculated result of the "monthly total." The answer may include a human-friendly interpretation of the answer in natural language, e.g., "for every week, monthly total increases by," and the calculated result, "$1,500." When a user asks the question in a certain language (e.g., non-English), the answer may correspondingly be provided in the same language.

In another implementation, at screen 402, the answer to the query "how's the growth of monthly totals" may take a variety of visualization format. For example, at 405, a chart may be generated showing different data plots 407 over a period of time, such as the monthly totals, commission income, sales of product and service income, etc., as related to the query question "growth of monthly total." The answer panel may further provide analytics of the data plots at 408.

In a further implementation, the answer screen 401 or 402 may include a rating button, a "like" or "dislike" button, or a "thumbs up" or "thumbs down" button for the user to provide feedback to the answer to the original question asked.

Figure 5:
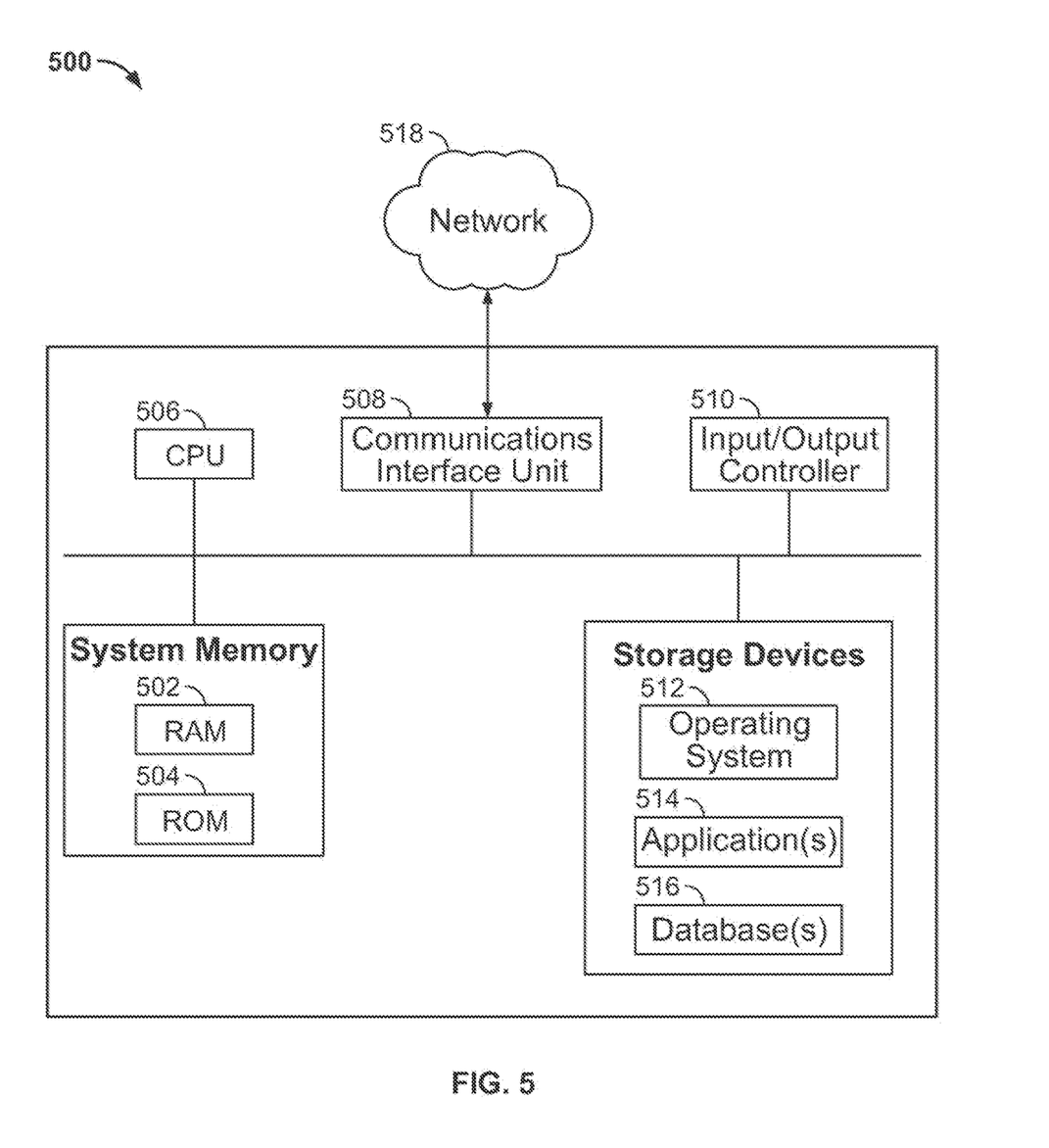
FIG. 5 is a block diagram of a computing device, such as any of the components of the system of FIG. 1, for performing any of the processes described herein.

FIG. 5 is a block diagram of a computing device, which could be any of the components of the system of FIG. 1, for performing any of the processes described in FIGS. 2A-3 or provide the user interface described in FIG. 4. Each of the components of these systems may be implemented on one or more computing devices 500. In certain aspects, a plurality of the components of these systems may be included within one computing device 500. In certain implementations, a component and a storage device may be implemented across several computing devices 500.

The computing device 500 comprises at least one communications interface unit, an input/output controller 510, system memory, and one or more data storage devices. The system memory includes at least one random access memory (RAM 502) and at least one read-only memory (ROM 504). All of these elements are in communication with a central processing unit (CPU 506) to facilitate the operation of the computing device 500. The computing device 500 may be configured in many different ways. For example, the computing device 500 may be a conventional standalone computer or alternatively, the functions of computing device 500 may be distributed across multiple computer systems and architectures. In FIG. 5, the computing device 500 is linked, via network or local network, to other servers or systems.

The computing device 500 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 508 to a communications hub or port (not shown) that serves as a primary communication link with other servers, client or user computers and other related devices. The communications hub or port may have minimal processing capability itself, serving primarily as a communications router. A variety of communications protocols may be part of the system.

The CPU 506 comprises a processor, such as one or more conventional microprocessors and one or more supplementary co-processors such as math co-processors for offloading workload from the CPU 506. The CPU 506 is in communication with the communications interface unit 508 and the input/output controller 510, through which the CPU 506 communicates with other devices such as other servers, user terminals, or devices. The communications interface unit 508 and the input/output controller 510 may include multiple communication channels for simultaneous communication with, for example, other processors, servers or client terminals.

The CPU 506 is also in communication with the data storage device. The data storage device may comprise an appropriate combination of magnetic, optical or semiconductor memory, and may include, for example, RAM 502, ROM 504, flash drive, an optical disc such as a compact disc or a hard disk or drive. The CPU 506 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 506 may be connected to the data storage device via the communications interface unit 508. The CPU 506 may be configured to perform one or more particular processing functions.

The data storage device may store, for example, (i) an operating system 512 for the computing device 500; (ii) one or more applications 514 (e.g., computer program code or a computer program product) adapted to direct the CPU 506 in accordance with the systems and methods described here, and particularly in accordance with the processes described in detail with regard to the CPU 506; or (iii) database(s) 516 adapted to store storage management information that may be utilized to manage storage information required by the program.

The operating system 512 and applications 514 may be stored, for example, in a compressed, an uncompiled or an encrypted format, and may include computer program code. The instructions of the program may be read into a main memory of the processor from a computer-readable medium other than the data storage device, such as from the ROM 504 or from the RAM 502. While execution of sequences of instructions in the program causes the CPU 506 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to any of the processes as described herein. The program also may include program elements such as an operating system 512, a database management system and "device drivers" that allow the processor to interface with computer peripheral devices (e.g., a video display, a keyboard, a computer mouse, etc.) via the input/output controller 510.

The term "computer-readable medium" as used herein refers to any non-transitory medium that provides or participates in providing instructions to the processor of the computing device 500 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 506 (or any other processor of a device described herein) for execution. For example, the instructions may initially be borne on a magnetic disk of a remote computer (not shown). The remote computer can load the instructions into its dynamic memory and send the instructions over an Ethernet connection, a cable line, or even a telephone line using a modem. A communications device local to a computing device 100 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information. In general one of ordinary skill in the art that the source features, destination features and content of the document are not limited in any way by the examples provided above.

What is claimed is:

1. A computer-implemented method for processing a natural language query, the method comprising:
  obtaining a natural language query;
  parsing the natural language query to obtain a query term;
  identifying a grid range in a data table as relevant to the query term;
  preparing a table summary by extracting a plurality of characteristics from the grid range in the data table;
  determining a logic operation to apply on the plurality of characteristics to derive a result corresponding to the query term;
  translating the logic operation into a formula executable on the data in the data table;
  applying the formula to the data in the data table to generate the result in response to the natural language query;
  responsive to receiving negative feedback to the result, automatically processing the negative feedback and preparing a new table summary based on the query term, wherein automatically processing the negative feedback comprises disassociating one or more formula building objects with the query term;
generating an alternative formula of the natural language query based on the new table summary; and
generating an alternative result based on the alternative formula.

2. The method of claim 1, wherein the natural language query is provided by a user via a user interface at a client device.

3. The method of claim 2, wherein the natural language query is manually or vocally entered by the user.

4. The method of claim 1, wherein the natural language query is received at a server from a client device via a hypertext transfer protocol (HTTP) post request.

5. The method of claim 1, wherein the natural language query is originated in a first language and is then translated into a second language.

6. The method of claim 1, wherein:
the identifying of the grid range is performed at a client device when the data table is stored at the client device; and
the identifying of the grid range is performed at a server after receiving the natural language query at the server when the data table is stored at the server.

7. The method of claim 1, wherein the data table includes any data table stored at a client device, a remote server, or a cloud.

8. The method of claim 1, wherein the data table comprises a plurality of data entities that include any of dimensions, dimension filters or metrics.

9. The method of claim 1, wherein the result is presented to a user via a visualization format including any of an answer statement, a chart, or a data plot.

10. The method of claim 1, further comprising:
storing the formula associated with the natural language query or the query term when user feedback is positive.

11. The method of claim 10, wherein translating the logic operation into the formula comprises:
selecting a formula build operation from a plurality of formula build operations based on the logic operation, wherein the formula build operation corresponds to a type of formula; and
executing the formula build operation to generate the formula based on the table summary and the logic operation.

12. The method of claim 1, wherein the result is translated into a respective language when the natural language query is received in the respective language.

13. A system for processing a natural language query, the system comprising:
a memory; and
a processor, coupled to the memory, to:
receive a parse request including a natural language query from a client device;
send a response including a formula calculating a result to the natural language query to the client device;
generate a table summary by extracting a plurality of data entities from one or more data tables identified as relevant to the natural language query;
determine a logic operation to apply on the plurality of data entities to derive the result to the natural language query;
translate the logic operation into a formula executable on the data table;
responsive to receiving negative feedback to the result, automatically process the negative feedback and generate a new table summary via a table detection module via a query interpretation module, wherein to automatically process the negative feedback, the processor is further to disassociate one or more formula building objects with the natural language query;
generate an alternative formula of the natural language query based on the new table summary; and
generate an alternative result based on the alternative formula.

14. The system of claim 13, wherein the parse request further includes a grid range from a data table.

15. The system of claim 13, wherein the processor is further to:
generate a structured database query based on the natural language query.

16. The system of claim 13, wherein the processor is further to:
extract the plurality of data entities from the table summary; and
provide the plurality of data entities in a table format to the query interpretation module.

17. The system of claim 13, wherein to translate the logic operation into the formula, the processor is further to:
select a formula build operation from a plurality of formula build operations based on the logic operation, wherein the formula build operation corresponds to a type of formula; and
execute the formula build operation to generate the formula based on the table summary and the logic operation.

18. The system of claim 13, wherein the processor is further to provide a user interface including an answer panel for a user to input the natural language query manually or vocally.

19. The system of claim 13, wherein the processor is further to calculate a result in response to the natural language query based on the formula and the data table.

20. A computer-readable non-transitory storage medium storing processor-executable instructions for a processor, the instructions to cause the processor to:
obtain a natural language query;
parse the natural language query to obtain a query term;
identify a grid range in a data table as relevant to the query term;
prepare a table summary including a plurality of data entities based on the grid range;
determine a logic operation to apply on the plurality of data entities to derive a result corresponding to the query term;
translate the logic operation into a formula executable on the data table;
apply the formula to the data in the data table to generate the result in response to the natural language query;
responsive to receiving negative feedback to the result, automatically process the negative feedback and prepare a new table summary based on the query term, wherein to automatically process the negative feedback, the processor is further to disassociate one or more formula building objects with the query term;
generate an alternative formula of the natural language query based on the new table summary; and
generate an alternative result based on the alternative formula.

* * * * *